Nov. 13, 1962            H. STROHMEIER            3,063,078
MEANS FOR REMOVING COATING FROM THE ENDS OF A
CONDUCTIVE CORE OF A WELDING ELECTRODE
Filed March 18, 1960
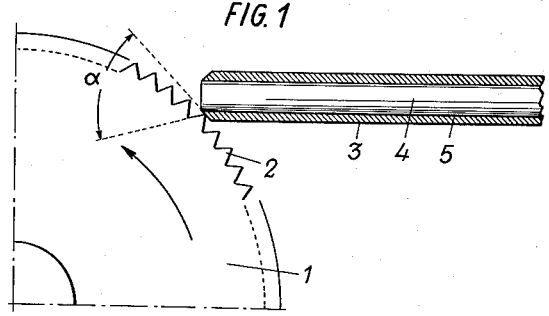
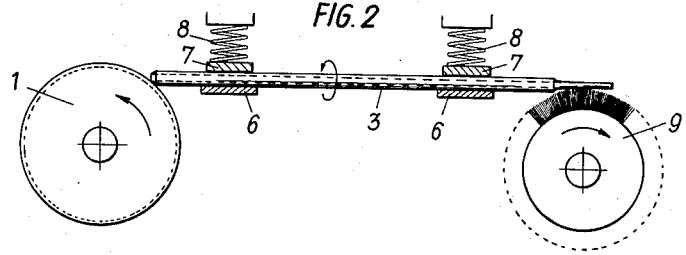
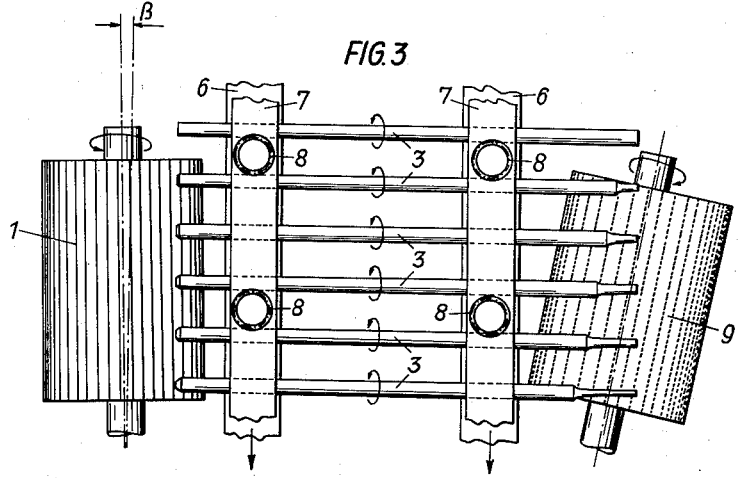
Inventor
H. Strohmeier

United States Patent Office 3,063,078
Patented Nov. 13, 1962

3,063,078
MEANS FOR REMOVING COATING FROM THE ENDS OF A CONDUCTIVE CORE OF A WELDING ELECTRODE
Harald Strohmeier, Styria, Austria, assignor to Gebr. Bohler & Co. Aktiengesellschaft, Vienna, Austria
Filed Mar. 18, 1960, Ser. No. 15,865
Claims priority, application Austria Mar. 25, 1959
3 Claims. (Cl. 15—4)

The present invention relates to welding electrodes, and more particularly has reference to means for removing coating from the respective ends of the conductive core of the electrode.

When leaving the coating unit, the conductive core of the welding electrode is entirely surrounded by a coating material. To enable electric contact with the conductive core by means of pliers, and in order to be able to hold the electrode by the pliers, the coating material must be removed along a considerable length of the electrode, starting from the clamping end. A smaller portion of the coating material also must be removed from the other end of the electrode, i.e. the ignition end, to enable contact with the work piece and formation of the arc immediately at the beginning of the welding process.

The coating material usually is removed by rotating wire brushes, but the surface exposed to brushing is rough, and thus is not able to remove the material properly from the conductive core. This surface is sufficiently blank at the clamping end, with the contacting surface being large, and the pressure exerted by the pliers being sufficiently high to take care of adequate contact.

This cleaning method, however, is not sufficient for the ignition end, since particles of coating material are likely to adhere to the core, and thus affect contact at the beginning of the process, and prevent formation of the arc, as the surface section of the work-piece, occupied by the electrode is small.

The usual practice to permit contact in spite of the foregoing circumstances has been to strike the work-piece with the rod, whereupon substantial portions of the coating material are likely to break off, and thus to cause defects in the welding-seam during the welding process.

To avoid this objection, the rotating brushes were replaced by a grinding wheel. This arrangement, however, did not solve the problem, as the grinding wheel became coated with the removed coating material. Although grinding wheels with harder bonding and coarser grain provide evener and cleaner surfaces, such wheels are apt to affect the conductive core, per se, during grinding, so that the end of the core is shaped to a truncated cone which is bare of coating material.

The coating should be shaped as a truncated cone at the ignition end of the electrode, and the end of the truncated cone should coincide closely with the end of the core, so that the cross-section of the core and the upper surface of the truncated cone are identical. Only a minor portion of the coating material is removed, and the edge of the conductive core is not entirely cleaned from the coating material. Hence, the rest of the material remaining either in a fillet joint, or inside a sharp angle of the work-piece, especially at the beginning of the welding process prevents contact between the conductive core and work-piece, and thus the arc cannot be formed.

However, if a greater amount of coating material is removed from the ignition end of the electrode so that the blank conductive core partly extends beyond the coating material, the core material initially will melt without the coating material during welding, and due to the lack of protection by the coating material or by the slag, a defect will arise at this precise location of the core material.

In order to prevent the above disadvantages, this invention sputters the coating material at the end of the electrode by means of a tool, the sputtering faces of which define a sharp adjusting angle with the cutting face, so that the sputtering action is performed neither by the cutting face, nor by grinding, but the tool functions in the manner of a scraper. Thus, only excessive coating material will be sputtered, while the conductive core is not affected.

Rolls have proven especially efficacious with such rolls having a periphery defining a series of equal sided triangles with the surface of the triangles serving to remove the coating material being inclined in the direction of movement, thereby providing a scraping action rather than a cutting action. In this way, the coating material will form a truncated cone, especially if the roll is roatated at a sufficiently high speed, and no abrading of the conductive core will occur, so that the core will not extend beyond the coating.

Further objects and advantages of the invention will appear from the following description and accompanying drawings, in which:

FIG. 1 is a fragmental elevational view, partly in cross-section, showing a roll having the periphery thereof defined by equal sided triangles, and with a welding electrode associated therewith, FIGURE 2 is an elevational view, partly in cross-section, of an assembly for removing the coating material from the ends of electrodes, and, FIGURE 3 is a plan view of FIGURE 2.

Referring to FIGURE 1, there is shown a roll 1 adapted to have rotary movement imparted thereto by any suitable means, and the roll preferably is a steel roll. The periphery or circumference of the roll is provided with equal sided triangles 2, and a welding electrode denoted generally 3 is shown in operative relationship to the roll 1. The electrode 3 includes a conductive core 4 and coating material 5.

If the roll 1 is rotated at high speed in the direction indicated by the arrow, and the welding electrode 3 is rotated about its longitudinal axis, the surfaces of the triangles 2 which effect removal of the covering material 5 are inclined in the direction of movement, thereby providing a scraping effect, rather than a cutting effect, but it will further be noted that the angle α should be between 3–50°, and preferably approximately 45°. This arrangement ensures that the coating at the ignition end of the electrode will define a truncated cone, and there will be no abrading of the conductive core 4. It will further be seen in FIGURE 1 that the frustum of the cone equals the diameter of the conductive core at the end of the core, thereby assuring proper contact between the core and the work-piece.

With reference to FIGURE 2, and FIGURE 3, the electrodes 3 which are continuously leaving the coating unit or press are disposed on conveyor bands 6 which move the electrodes to the roll 1. Clamping strips or the like 7 are arranged above the bands 6, and coil springs or the like 8 operably associated with the strips 7 urge the strips, and as a consequence the electrodes 3 against the bands 6 under a slight pressure. The electrodes are thereby caused to rotate about their longitudinal axes by the movement of the bands 6 in the direction indicated by the arrows at half speed. During rotation, the ends of the electrodes 3 pass the roll 1, and the axis of the roll 1 is substantially parallel to the bands 6, with the ends of the coating being removed so as to form the truncated cone previously mentioned. It is further advantageous to arrange the roll 1 so that its axis and the axis of the bands 6 define a small angle β of approximately 1–15°, so as to enable adjusting of the ends of the electrodes at an equal distance with respect to the edges of the conveyor bands. The simultaneous removal of the coating material from the clamp end of the electrode can be accomplished by means of a brushing roll 9 which is arranged at an angle to the band 6 to permit continuous brushing. The brushing roll 9 rotates in a direction opposite to the direction of rotation of the roll 1.

By virtue of the angle β, electrodes 3 which often may be of unequal length can be uniformly aligned at the ignition end, and the covering material 5 is never removed to the extent that a bare part of the conductive core 4 is visible at the ignition end.

If the electrodes are of unequal length, the covering material is removed along a certain length thereof so that a bare clamping end is provided.

The invention is not to be confined to any strict conformity to the drawings, but changes and modifications may be made therein, so long as such changes or modifications mark no material departure from the spirit and scope of the appended claims.

What I claim is:

1. Apparatus for removing coating composition from one end portion of a rod-shaped arc welding electrode having a conductive core, which apparatus comprises an electrode support adapted to rotatably carry a rod-shaped arc welding electrode in predetermined axial position, a scraping roller provided on its periphery with a plurality of peripherally spaced, blunt projections, the axis of said roller being substantially at right angles to the axis of said electrode, said roller contacting said electrode so that the end face of said conductive core at said end portion adjoins the circle defined by the radially outermost portions of said projections at a point at which the tangent on said circle includes with the axis of said electrode an angle of 40 to 60 degrees, and means for rotating said roller in contact with said electrode, said electrode support comprising means for rotating said electrode in contact with said roller, whereby part of said coating composition is removed from said end portion and the coating composition remaining on said end portion is given substantially the shape of a frustum of a cone which has an included angle of 80 to 120 degrees and a small base which coincides in area with the cross-section of said conductive core.

2. Apparatus as set forth in claim 1, in which said electrode support comprises a conveyor adapted to carry said electrode so that the same is adjustable in the direction of its axis on said conveyor and operable to move said electrode past said roller in contact therewith in a direction which converges with the direction of the axis of said roller at an angle of 1 to 15 degrees.

3. Apparatus as set forth in claim 1, in which said support is adapted to carry said electrode in such a manner that said end face of said conductive core at said end portion adjoins the circle defined by the radially outermost portions of said projections at a point at which the tangent on said circle includes with the axis of said electrode an angle of approximately 45 degrees.

References Cited in the file of this patent

UNITED STATES PATENTS

| | | |
|---|---|---|
| 324,641 | Berry | Aug. 18, 1885 |
| 1,930,219 | Zimber | Oct. 10, 1933 |
| 2,531,009 | Stuart | Nov. 21, 1950 |